(12) United States Patent
Rupp et al.

(10) Patent No.: US 6,523,911 B1
(45) Date of Patent: Feb. 25, 2003

(54) METHOD AND DEVICE FOR STABILIZING A VEHICLE

(75) Inventors: Peter Rupp, Steinheim (DE); Andreas Zoebele, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/763,273

(22) PCT Filed: Jun. 27, 2000

(86) PCT No.: PCT/DE00/02091

§ 371 (c)(1),
(2), (4) Date: Mar. 23, 2001

(87) PCT Pub. No.: WO01/02227

PCT Pub. Date: Jan. 11, 2001

(30) Foreign Application Priority Data

Jun. 30, 1999 (DE) .......................................... 199 29 830
Dec. 30, 1999 (DE) .......................................... 199 64 048

(51) Int. Cl.$^7$ ............................................... B60T 13/00
(52) U.S. Cl. ........................ 303/7; 303/123; 188/112 A
(58) Field of Search ........................... 303/7, 123, 147, 303/166, 9.67, 9.62; 188/112 A; 701/72; 280/432, 455.1; 180/197

(56) References Cited

U.S. PATENT DOCUMENTS

| | | | | |
|---|---|---|---|---|
| 4,023,864 A | * | 5/1977 | Lang et al. ............... | 188/112 A |
| RE30,550 E | * | 3/1981 | Reise ...................... | 188/112 A |
| 5,747,683 A | * | 5/1998 | Gerum et al. ................. | 701/72 |
| 6,012,780 A | * | 1/2000 | Duvernay ............... | 188/112 R |
| 6,042,196 A | | 3/2000 | Katsushi et al. | |

FOREIGN PATENT DOCUMENTS

| | | |
|---|---|---|
| DE | 41 27 750 | 9/1992 |
| DE | 195 36 620 | 4/1997 |
| EP | 0 433 858 | 6/1991 |
| EP | 0 989 049 | 3/2000 |
| GB | 2 257 403 | 1/1993 |
| JP | 10 236289 | 9/1998 |
| JP | 02000043694 A * | 2/2000 |

OTHER PUBLICATIONS

Zanten et al., "FDR—die Fahrdynamikreglung von Bosch", [VDS—The Vehicle Dynamics Control of Bosch], ATZ Automobiltechnische Zeitschrift 96 (1994) 11, pp. 674–689.
Hecker et al., "Vehicle Dynamics Control for Commercial Vehicles," SAE paper 973284, 1997, pp. 59–66.

* cited by examiner

*Primary Examiner*—Christopher P. Schwartz
*Assistant Examiner*—Xuan Lan Nguyen
(74) *Attorney, Agent, or Firm*—Kenyon & Kenyon

(57) ABSTRACT

A method and a device for stabilizing a road vehicle, particularly a passenger car, having a trailer pulled by the road vehicle, the road vehicle being monitored with respect to snaking movements, and upon detection of a snaking movement, a yaw moment that is essentially in phase opposition to the snaking movement being applied automatically to the road vehicle.

26 Claims, 6 Drawing Sheets

METHOD AND DEVICE FOR STABILIZING A VEHICLE

The present invention relates to a method and a device for stabilizing a road vehicle, particularly a passenger car, having a trailer pulled by the road vehicle. In the case of road vehicles with trailers, the road vehicle/trailer combination can begin to snake due to excessive speed, bad road conditions, crosswinds or the like. It may be that, for example, the article "*FDR—die Fahrdynamikreglung von Bosch*", [VDC—The Vehicle Dynamics Control of Bosch] by A. van Zanten, R. Erhardt and G. Pfaff, ATZ Automobiltechnische Zeitschrift 96 (1994) 11, pages 674 through 689 and the SAE paper 973184 "*Vehicle Dynamics Controller for Commercial Vehicles*" by F. Hecker, S. Hummel, O. Jundt, K. D. Leimbach, I. Faye, H. Schramm describe very successful design approaches for stabilizing the dynamics control of vehicles and semitrailer trucks, yet special difficulties arise when pulling trailers, particularly trailers which do not have their own actuators and sensors for dynamics control stabilization. This is true in particular for trailers which are heavy compared to the towing vehicle. Thus, for example, special stability problems occur in the case of passenger cars which are towing travel trailers.

If a snaking movement or pendulum motions occur in a vehicle combination composed of a motor vehicle and trailer, then the trailer oscillates about its vertical axis and, by way of the trailer hitch, also prompts the towing vehicle to oscillate. If the vehicular speed is below a so-called critical speed, then the oscillations are damped. If the vehicular speed is equal to a critical speed, then oscillations are undamped; if the vehicular speed is above a critical speed, then the oscillations increase in amplitude. The value of the critical speed is a function, inter alia, of geometric data such as wheelbase and drawbar length, of the mass and the moment of yaw inertia of the vehicle and of the trailer, and of the slip-angle rigidity of the axles. For vehicle combinations in the passenger car sector, this value typically varies in the range from 90 to 130 km/h. The frequency of the snaking movement or of the pendulum motion is approximately 0.5 to 1.5 Hz.

Accordingly, the object of the present invention is to specify a method and a device by which the directional stability for road vehicles which are pulling a trailer is improved. It is particularly desirable that the design approach according to the invention gets along with low expenditure for sensors.

This objective is achieved by a method according to claim 1 and a device according to claim 12. In this context, to stabilize a road vehicle, particularly a passenger car, having a trailer pulled by the road vehicle, the road vehicle is monitored with respect to snaking movements and, upon detection of a snaking movement, an essentially periodic yaw moment, in particular at least two periods long, which essentially is in phase opposition to the snaking movement, is automatically applied to the road vehicle. In this manner, it is possible to reduce snaking of the road vehicle/trailer combination and to stabilize the combination. To be understood by snaking in this context is that the road vehicle which is pulling the trailer is subject to an essentially periodic lateral acceleration as well as an essentially periodic yaw rate. In this case, it is not a strictly periodic pendulum phenomenon (the vehicle combination does not represent an ideal pendulum), but rather, time fluctuations can occur in the period duration of the pendulum motion of the trailer or semitrailer. These fluctuations are evident as well, for example, in the repeating or recurrent or essentially periodic signal generated by a lateral-acceleration sensor. That is to say, this signal has a period duration, changing within small boundaries, which ideally, however, is to be regarded as constant over time. Correspondingly, the applied, essentially periodic yaw moment is also not strictly periodic. The period duration in the applied yaw moment is also changed corresponding to the fluctuations in the periods of the pendulum motion of the vehicle combination.

For example, to detect a snaking movement, the lateral acceleration of the road vehicle can be measured by a lateral-acceleration sensor. The frequency and the amplitude of the signal, determined with the aid of the lateral-acceleration sensor, are evaluated to discern the snaking. The frequency is derived, for example, from the time interval between successive zero crossings. Snaking is present, e.g., when the frequency thus ascertained lies within a predetermined frequency band and when the amplitude is greater than a threshold value. In this connection, in addition to the lateral acceleration, it is advantageous to consider the speed and/or the steering angle of the vehicle in order to differentiate snaking from steering movements of the vehicle. An example for the detection of snaking is set forth in FIG. 9.

It is particularly advantageous in connection with the present invention to utilize a snaking detection in which at least one lateral-motion-dynamics variable such as the lateral acceleration, the yaw rate or the yaw acceleration, as well as the vehicular speed are determined, the snaking movement being determined as a function of the at least one lateral-motion-dynamics variable and the speed. This is advantageously implemented by checking whether the lateral-motion-dynamics variable and the speed, respectively, are greater than threshold values assigned to them. It is particularly advantageous to measure both the lateral acceleration and the yaw rate. To ascertain a snaking movement, it is furthermore of advantage to measure the steering angle, and to take quick steering movements into account when determining the snaking movements. To that end, a high-pass filter is advantageously provided which is used to filter a signal corresponding to the steering angle. If this high-pass-filtered steering signal is greater than a specific threshold value, then it can advantageously be assumed that no snaking movement is present.

In an advantageous refinement of the present invention, the yaw moment is applied by the automatic braking of the road vehicle, different braking forces being applied on both sides of the road vehicle. Thus, the periodic yaw moment is applied in a particularly advantageous manner without the necessity for steering movements. In addition, this refinement makes it possible to implement the present invention particularly conveniently in vehicles equipped with anti-lock braking systems, even when they have no vehicle dynamics control (VDC, ESP).

In a further advantageous development of the present invention, the essentially periodic yaw moment is applied by automatic one-sided braking of the vehicle. Particularly good stabilization of the road vehicle/trailer combination is achieved in this manner.

In another advantageous embodiment of the invention, the road vehicle is monitored for instability, and the yaw moment is only applied when no instability of the road vehicle is detected.

In a further advantageous refinement of the invention, the trailer has an inertia braking system. After and/or in addition to applying the essentially periodic yaw moment, the road vehicle is automatically decelerated for a short duration in such a way that the inertia braking system of the trailer is triggered.

A further advantageous development of the present invention provides that the short-duration automatic deceleration of the road vehicle is shifted by the amount of a fixed phase from the zero crossing of the snaking movement. This particularly takes into account the inertia of the trailer. The braking is carried out shortly—by the amount of a certain fixed phase—prior to or after a zero crossing.

For the case when the inertia of the trailer is negligible, the short-duration automatic deceleration of the road vehicle can also be carried out in a zero crossing of the snaking movement.

According to another advantageous embodiment of the invention, the short-duration automatic deceleration of the road vehicle is only carried out when the application of the essentially periodic yaw moment has resulted in a reduction of the snaking movement beforehand.

In another advantageous refinement of the invention, the automatic short-duration deceleration for triggering the inertia braking system of the trailer is implemented by reducing the drive torque of an engine propelling the road vehicle.

According to another advantageous development of the present invention, the road vehicle is automatically accelerated for a short duration.

The invention is used particularly advantageously in conjunction with hydraulic braking systems. However, it can also be utilized in electrohydraulic or in pneumatic or electropneumatic, or in electromechanical braking systems.

The invention has, inter alia, the following advantages:

The procedure of the present invention acts on the towing vehicle and is thus independent of the respective trailer. Accordingly, in advantageous embodiment of the invention, no additional sensors or actuators are implemented on the trailer.

The procedure of the present invention can fall back upon the sensors made available by anti-lock braking systems (ABS), traction-control systems (TCS) or vehicle dynamics controls (VDC). Usually no further sensors are necessary.

The snaking frequency can be learned, i.e., the snaking detection adapts itself independently to the respective vehicle.

When using the method and device of the present invention, it is possible to dispense with a mechanical device at the trailer hitch for detecting the snaking excursion.

Further advantages and particulars come to light from the following description of exemplary embodiments. Shown in detail are:

FIG. 1: a combination composed of a road vehicle and a trailer;

FIG. 2: the excursion of the trailer hitch of the road vehicle during snaking of the combination;

FIG. 3: lateral acceleration and yaw rate of the road vehicle during snaking of the combination;

FIG. 4: the speeds of the left and right rear wheels of the road vehicle during snaking of the combination;

FIG. 5: an exemplary adjustment according to the invention of the braking pressure at the right rear wheel of the road vehicle;

FIG. 6: an exemplary adjustment according to the invention of the braking pressure at the left rear wheel of the road vehicle;

FIG. 7: an exemplary embodiment for a stabilization device;

FIG. 8: a particularly advantageous exemplary embodiment for stabilizing a vehicle/trailer combination;

FIG. 9: the internal construction of a stabilization device; and

FIG. 10: the internal construction of a braking-pressure calculator from FIG. 9.

FIG. 1 shows a combination of a road vehicle 1 and a trailer 2, trailer 2 being hitched to a trailer hitch 3 of the road vehicle. $R_{VR}$ designates the right front wheel, $R_{VL}$ designates the left front wheel, $R_{HR}$ designates the right rear wheel and $R_{HL}$ designates the left rear wheel of road vehicle 1. $\omega$ designates the yaw rate of the road vehicle and $a_y$ designates the lateral acceleration of road vehicle 1. S designates the excursion of the trailer hitch of road vehicle 1.

Figure 4:
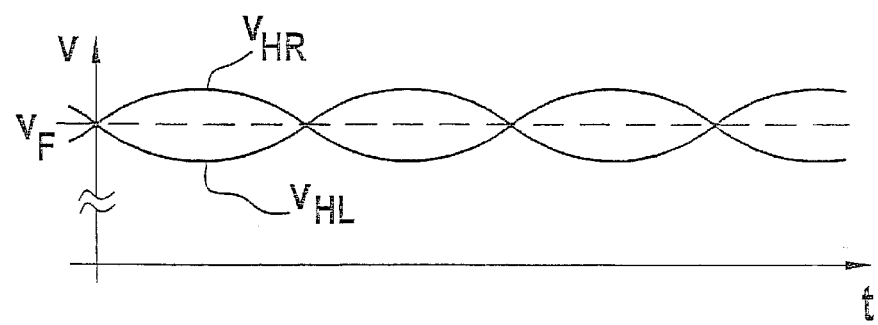

During snaking, the speeds of the individual wheels of vehicle 1 deviate from the characteristic of their average speed which corresponds essentially to vehicular speed $V_F$. This is shown by way of example in FIG. 4 for speed $V_{HR}$ of right rear wheel $R_{HR}$ and speed $V_{HL}$ of left rear wheel $R_{HL}$. According to the present invention, road vehicle 1 is monitored with respect to snaking movements, and in response to snaking, a yaw moment which is essentially in phase opposition to the snaking movement is applied automatically to the road vehicle. The yaw moment is applied in particularly advantageous manner by automatic, one-sided braking, in particular essentially of the rear wheels, of the vehicle.

Figure 5:
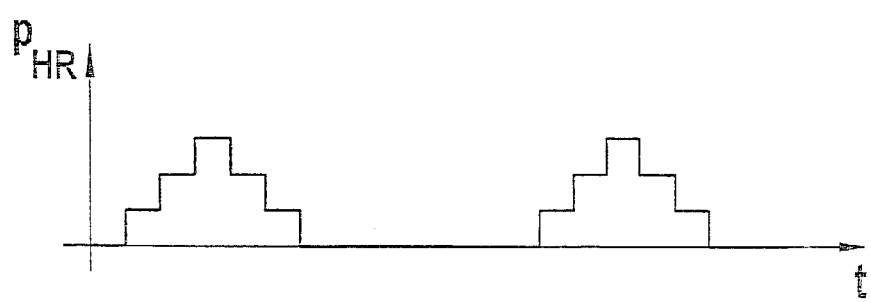
Figure 6:
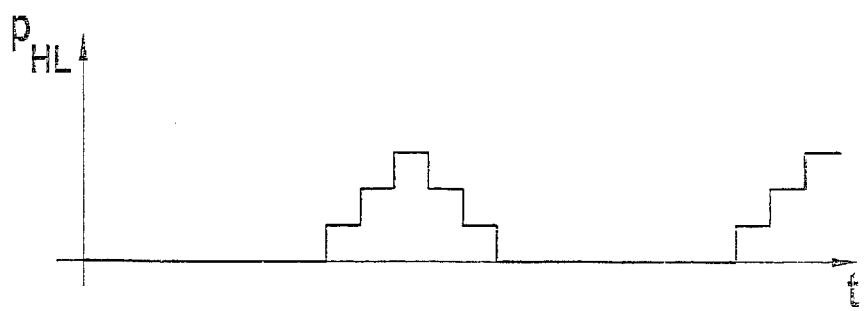

In an embodiment by way of example, FIGS. 5 and 6 show braking pressures $P_{HR}$ at right rear wheel $R_{HR}$ and $P_{HL}$ at left rear wheel $R_{HL}$ for the application of an anti-phase (essentially periodic) yaw moment by automatic one-sided braking of vehicle 1. As FIGS. 5 and 6 show, braking pressures $P_{HR}$ and $P_{HL}$ are in phase opposition and, according to the triggering shown, generate a yaw moment in phase opposition to the snaking movement of the vehicle combination.

Figure 7:
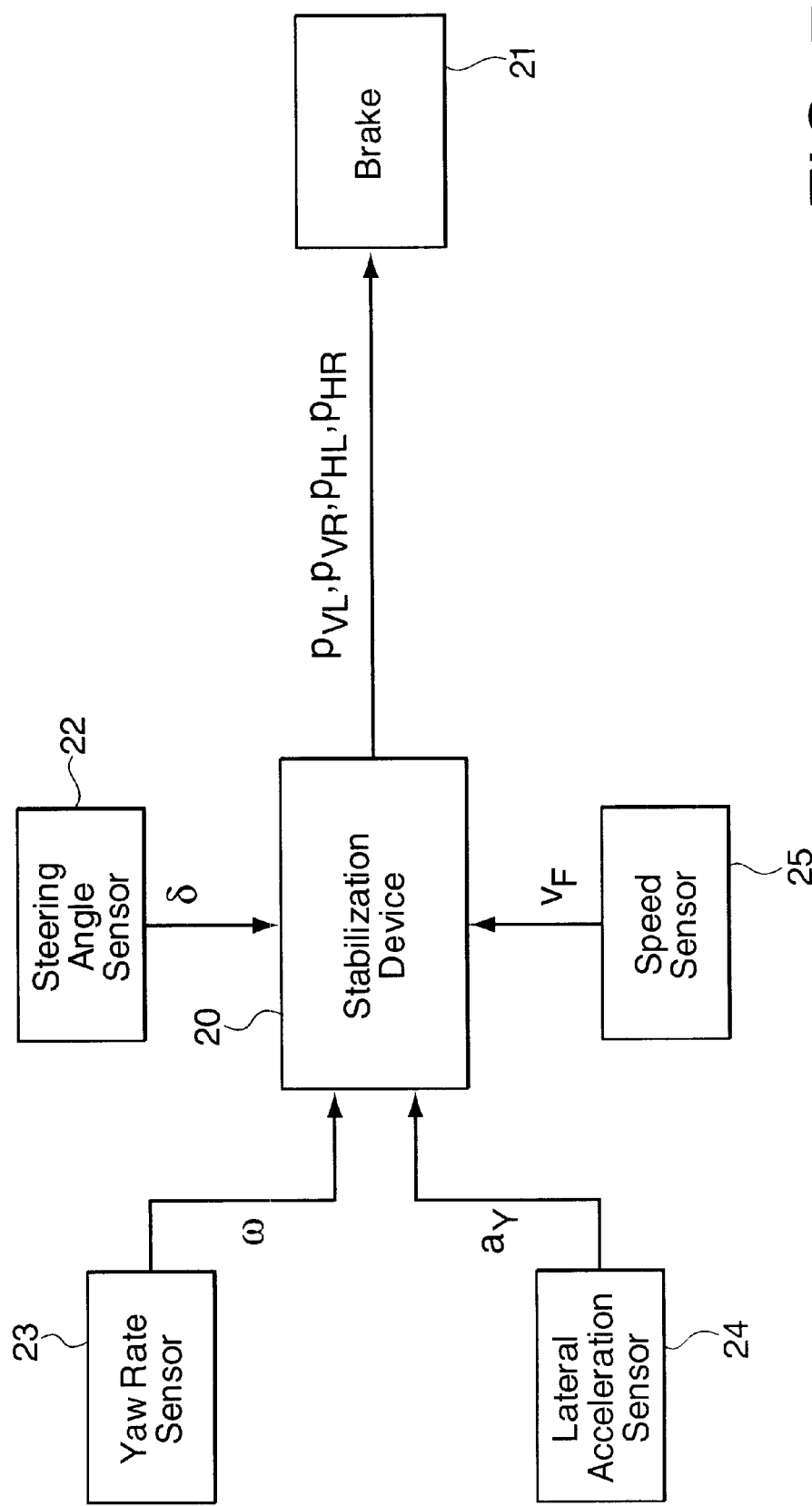

FIG. 7 shows an exemplary embodiment of a stabilization device 20 according to the present invention. Stabilization device 20 is connected to a steering-angle sensor 22 for measuring steering angle $\delta$, to a yaw-rate sensor 23 for measuring yaw rate $\omega$ of road vehicle 1, to a lateral-acceleration sensor 24 for measuring lateral acceleration $a_y$ of road vehicle 1, as well as to a speed sensor 25 for measuring vehicular speed $V_F$. In an advantageous refinement, road vehicle 1 has a vehicle dynamics control as is described, for example, in the article "*FDR—die Fahrdynamikreglung von Bosch*" by A. van Zanten, R. Erhardt and G. Pfaff, ATZ Automobiltechnische Zeitschrift 96 (1994) 11 pages 674 through 689. In this case, vehicular speed $V_F$ is not supplied by vehicular-speed sensor 25, but rather by the vehicle dynamics control.

The output variables of stabilization device 20 are, for example, braking pressures $P_{VL}$, $P_{VR}$, $P_{HR}$, $P_{HL}$ for wheels $R_{VR}$, $R_{VL}$, $R_{HR}$, $R_{HL}$ of road vehicle 1, i.e. corresponding manipulated variables which cause the adjustment of braking pressures $P_{VL}$, $P_{VR}$, $P_{HR}$, $P_{HL}$ in brake 21 of road vehicle 1.

Figure 8:
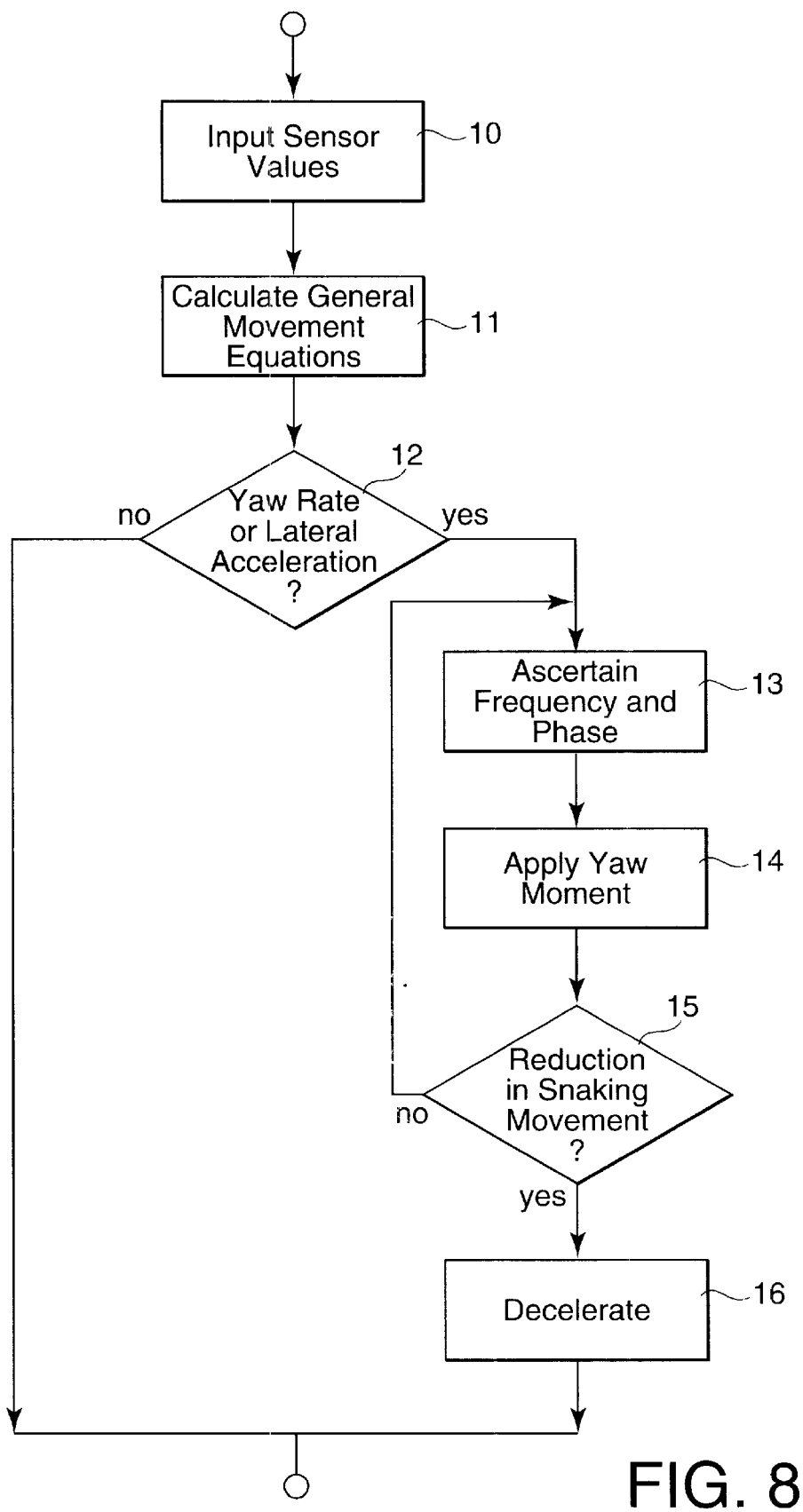

FIG. 8 shows a particularly advantageous exemplary embodiment for stabilizing a vehicle/trailer combination using the principle of the present invention. In a first step 10, measured values of the sensors on vehicle 1, which FIG. 7 shows, are input. In a second step 11, the general movement equations of the road vehicle without trailer are calculated. The calculations according to step 11 are explained in greater detail in FIG. 9.

The movement equations correspond to mathematical relations which, taking simple mathematical models as a basis, describe the vehicle movement. At this point, reference is made, for example, to the article "*FDR—die Fahrdynamikreglung von Bosch*" by A. van Zanten, R. Erhardt and G. Pfaff, ATZ Automobiltechnische Zeitschrift 96 (1994) 11 pages 674 through 689. Equation 4 contained in this article, which is also designated as the Ackermann relation, represents such a movement equation.

In a decision block 12, it is checked whether a lateral acceleration or a yaw rate exists at the vehicle which is not attributable to a steering motion by the driver. If this condition is not met, then interventions are not carried out within the framework of the vehicle stabilization according to the present invention. However, further possible procedures for vehicle stabilization, e.g. caused by a vehicle dynamics control indicated above, remain unaffected by this. On the other hand, if snaking of road vehicle 1, i.e. snaking of the rear of road vehicle 1, is detected, without road vehicle 1 being unstable, then in a next step 13, frequency and phase of the snaking movement are ascertained. That is to say, in this case, interventions according to the present invention are necessary for stabilizing the vehicle combination.

After determining the frequency and phase of the snaking movement, in a next step 14, a yaw moment which is in phase opposition to the snaking movement is applied to road vehicle 1. This is advantageously implemented by applying different braking forces on both sides of road vehicle 1, the yaw moment advantageously being applied by the one-sided braking of road vehicle 1, as is shown by way of example in FIGS. 5 and 6.

In an advantageous exemplary refinement, a further decision block 15 and a further step 16 are additionally provided. Decision block 15 is used to check whether the application of a yaw moment which is essentially in phase opposition (compare step 14) has led to a reduction in the snaking movement. If this is not the case, then step 13 follows. However, if the application of the yaw moment, which is essentially in phase opposition, leads to a reduction in the snaking movement of the combination composed of road vehicle 1 and trailer 2, then road vehicle 1 is automatically decelerated for a short duration (step 16), so that the inertia braking system of trailer 2 is triggered. This braking process is advantageously carried out in a manner that it is essentially shifted by the amount of a fixed phase from the zero crossing of the snaking movement.

An advantageous refinement of the invention provides that, in this context, the speed of the vehicle combination is reduced to the extent that it falls below a critical speed.

Figure 9:
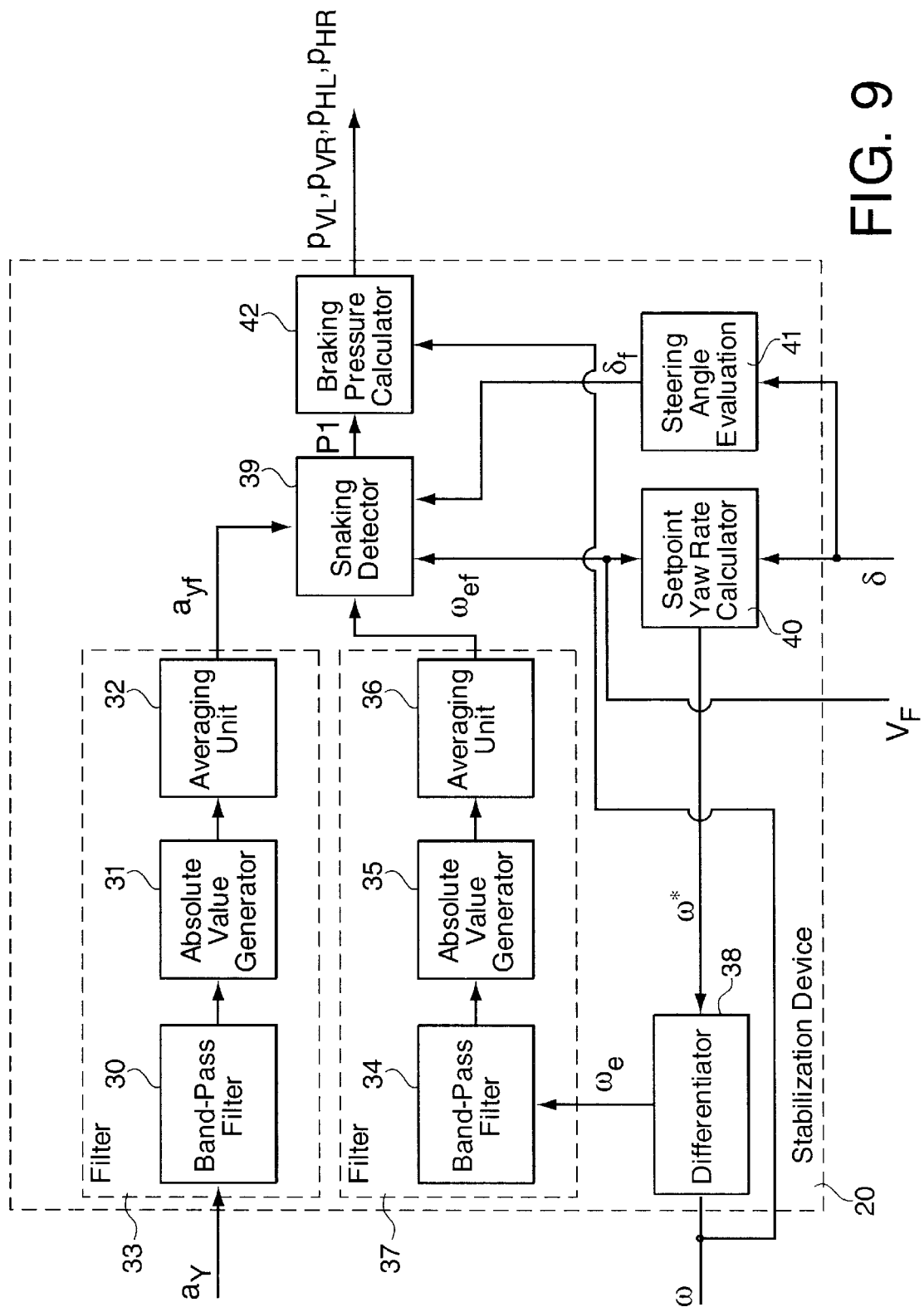

FIG. 9 shows the internal construction of a stabilization device 20 in an embodiment by way of example. Reference numeral 40 designates a setpoint yaw-rate calculator for calculating a setpoint yaw rate $\omega^*$. In so doing, setpoint yaw rate $\omega^*$ is calculated, for example, according to the setpoint yaw-rate calculation as is described in the article "*EDR—die Fahrdynamikreglung von Bosch*" by A. van Zanten, R. Erhardt and G. Pfaff, ATZ Automobiltechnische Zeitschrift 96 (1994) 11, pages 674 through 689. Alternatively thereto, provision can be made that, when road vehicle 1 has an above-indicated vehicle dynamics control, stabilization device 20 does not itself calculate setpoint yaw rate $\omega^*$, but rather it is obtained from the vehicle dynamics control.

The movement equations correspond to mathematical relations which, taking simple mathematical models as a basis, describe the vehicle movement. At this point, reference is made, for example, to the article "*FDR—die Fahrdynamikreglung von Bosch*" by A. van Zanten, R. Erhardt and G. Pfaff, ATZ Automobiltechnische Zeitschrift 96 (1994) 11, pages 674 through 689. Equation 4 contained in this article, which is also designated as the Ackermann relation, represents such a movement equation (see above). A setpoint value for the yaw rate of the vehicle is ascertained by the setpoint yaw-rate calculator as a function of the vehicular speed and the steering angle. That is to say, the setpoint yaw rate is calculated with the aid of a movement equation.

In corresponding manner, it is also possible to evaluate a movement equation with which the lateral acceleration of the vehicle is calculated. In this case, the setpoint value for the lateral acceleration thus ascertained would be compared to the measured value for the lateral acceleration.

Setpoint yaw rate $\omega^*$, together with yaw rate $\omega$, is an input variable in a differentiator 38 which calculates a yaw-rate system deviation $\omega_e$ as the difference between setpoint yaw rate $\omega^*$ and yaw rate $\omega$. Yaw-rate system deviation $\omega_e$ is filtered by a filter 37. Filter 37 has a band-pass filter 34, an absolute-value generator 35 and an averaging unit 36. Averaging unit 36 is advantageously constructed as a low-pass filter. Band-pass filter 34 is designed in such a way that it only lets through components of yaw-rate system deviation $\omega_e$ which lie in a frequency range that is characteristic for the pendulum motion of road vehicle 1. In this context, the band-pass filter is advantageously so designed that it is traversible only in the frequency range between 0.5 and 1.5 Hz. The output signal of filter 37 is designated by $\omega_{ef}$.

In the same manner as yaw-rate system deviation $\omega_e$, filtering is carried out for lateral acceleration $a_y$. To that end, stabilization device 20 has a filter 33. Filter 33 is constructed in a manner corresponding to filter 37. It has a band-pass filter 30 which is identical to band-pass filter 34. Filter 33 also has an absolute-value generator 31 which is identical to absolute-value generator 35. Furthermore, filter 33 has an averaging unit 32 which is identical to averaging unit 36. The output signal of filter 33 is a signal designated by $a_{yf}$.

In advantageous refinement of the invention, the snaking frequency is learned, i.e. the snaking detection adapts independently to the respective vehicle combination. To that end, an advantageous refinement provides that band-pass filters 30 and 34, respectively, are set to the snaking frequency of the vehicle combination. The various characteristic filter quantities, e.g. the frequency limits of the band-pass filters, adapt automatically or independently to the respective vehicle combination.

Stabilization device 20 has a steering-angle evaluator 41. Steering-angle evaluator 41 has a dead zone for masking out small steering angles $\delta$, a high-pass filter for masking out slowly proceeding steering-angle changes, as well as an integrator for integrating the high-pass-filtered steering angle. The output quantity of steering-angle evaluator 41 is designated by $\delta_f$.

The calculations proceeding in filters 33 and 37, in differentiator 38, in setpoint yaw-rate calculator 40 and in steering-angle evaluator 41 are to be assigned to step 11 in FIG. 8.

A snaking detector 39, which essentially represents an exemplary embodiment for decision block 12 of the flowchart according to FIG. 8, is used to decide whether or not a snaking movement is present. To that end, according to the present exemplary embodiment, a check is made as to whether the following conditions are met:

$\delta_f > S1$ $a_{yf}<S2$
$\omega_{ef}<S3$
$V_F<S4$ where S1, S2, S3 and S4 are threshold values. The check with respect to threshold value S4 can also be omitted. The output quantity of snaking detector 39 is a binary quantity P1 which assumes the value 0 when snaking is negated, and the value 1 when the above-indicated conditions are fulfilled, i.e. when snaking is detected.

If snaking is detected, then braking pressures $p_{VL}$, $p_{VR}$, $p_{HR}$, $p_{HL}$ for wheels $R_{VR}$, $R_{VL}$, $R_{HR}$, $R_{HL}$ of road vehicle 1 are ascertained by a braking-pressure calculator 42 according to the procedure described in FIG. 8. In this context, steps 13 and 14 as well as, in so far as implemented, step 16 and decision block 15 are to be assigned to braking-pressure calculator 42.

Alternatively to the snaking detection described in FIG. 9, the lateral acceleration of the road vehicle is measured or derived from measured values concerning the wheel speeds. The lateral acceleration, measured or derived from the wheel speeds, undergoes a frequency analysis (e.g. a Fourier analysis). That is to say, the appertaining variable is broken down into its individual spectral components. From these spectral components, it is possible to check whether a component at the frequency that is characteristic for the snaking movement is also present. If this is the case, then the essentially periodic yaw moment is applied.

Figure 1:
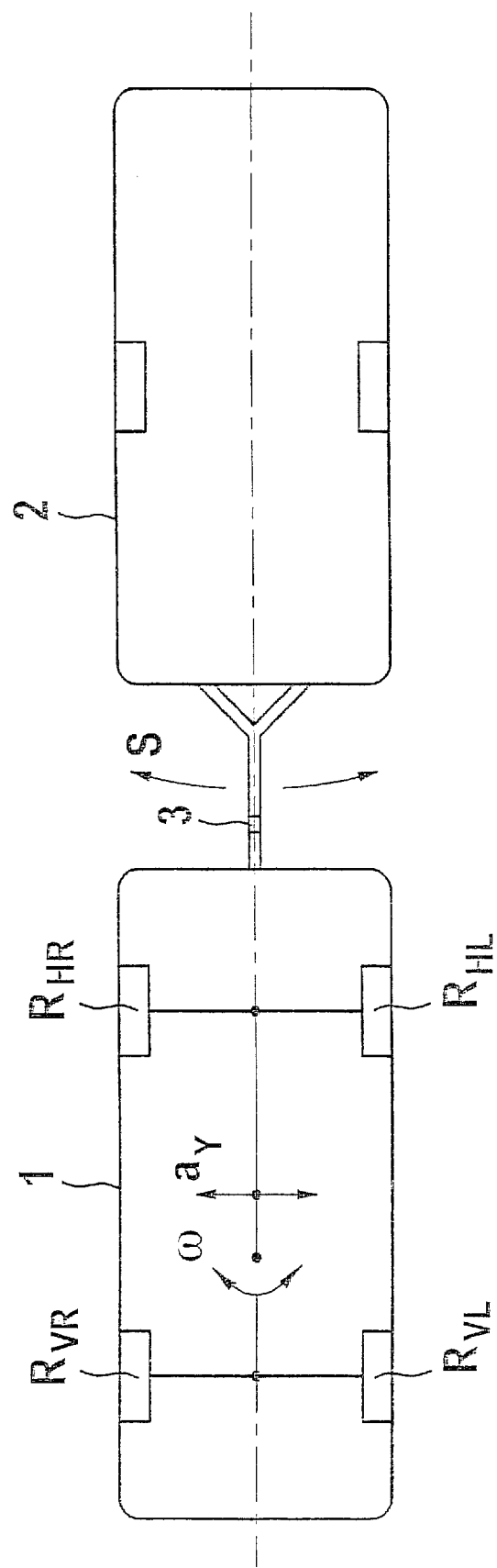
Figure 2:
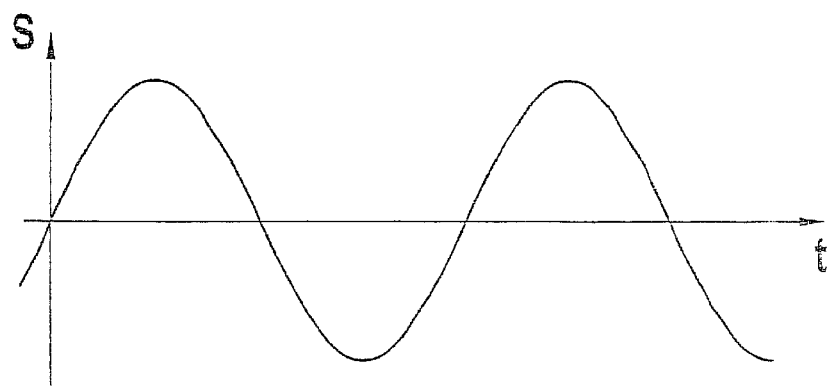
FIG. 2 shows excursion S of trailer hitch 3 of the road vehicle during snaking of the road vehicle over time t. In this context, positive values of excursion S correspond to an excursion to the right, and negative values of excursion S correspond to an excursion to the left.
Figure 3:
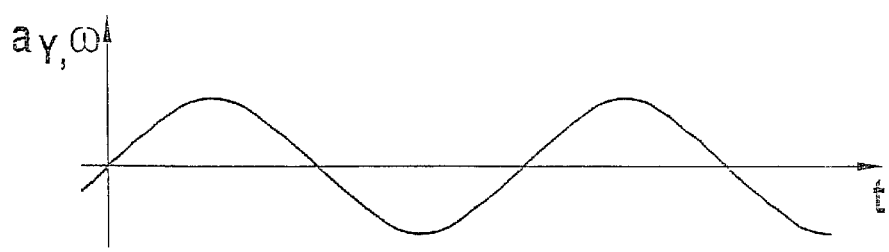
FIG. 3 shows an exemplary characteristic curve of lateral acceleration $a_y$ corresponding to the snaking movement in FIG. 2, and of yaw rate $\omega$ corresponding to the snaking movement in FIG. 2.
Figure 10:
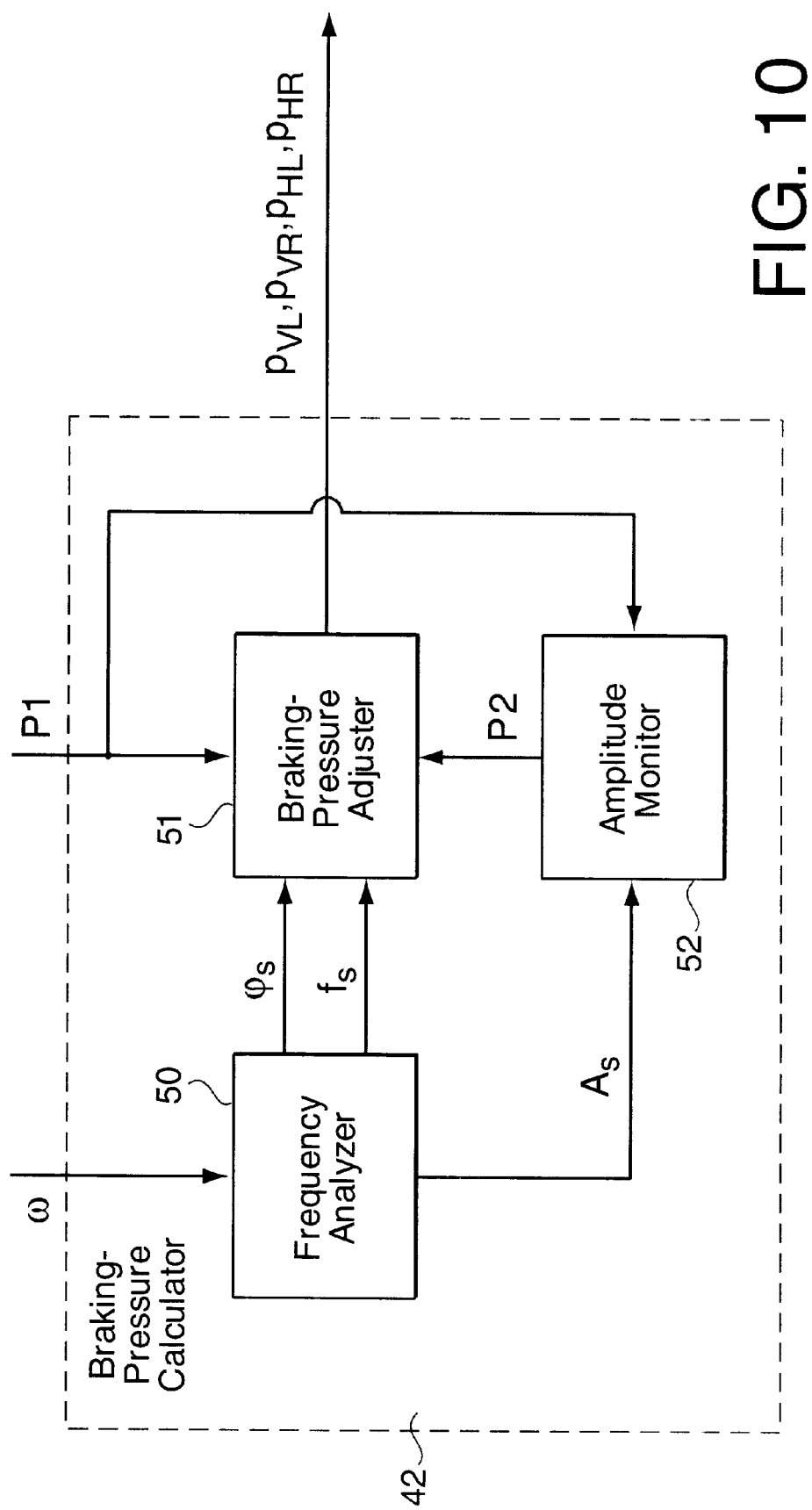

FIG. 10 shows the internal construction of braking-pressure calculator 42. Reference numeral 50 designates a frequency analyzer which determines frequency $f_s$, phase $\phi_s$ and amplitude $A_s$ of the snaking movement as a function of lateral acceleration $a_y$ and/or yaw rate $\dot{\phi}$. According to this exemplary embodiment, frequency $f_s$, phase $\omega_s$ and amplitude $A_s$ of the snaking movement are determined as a function of yaw rate $\omega$. Provided signal P1 indicates a snaking movement, a braking-pressure adjuster 51, as a function of frequency $f_s$ and phase $\phi_s$ of the snaking movement, determines braking pressures $p_{VL}$, $p_{VR}$, $p_{HR}$, $p_{HL}$ for wheels $R_{VR}$, $R_{VL}$, $R_{HR}$, $R_{HL}$ of road vehicle 1, i.e. corresponding manipulated variables which cause the adjustment of braking pressures $p_{VL}$, $p_{VR}$, $p_{HR}$, $p_{HL}$ in brake 21 of road vehicle 1. In this context, the braking pressures adjusted at the wheels change according to snaking frequency $f_s$ (see FIG. 2, FIG. 5 and FIG. 6).

In particular, provision is made to brake only the rear wheels, as shown in FIGS. 5 and 6, when road vehicle 1 has only a traction control system (TCS) or an anti-lock braking system (ABS). On the other hand, if road vehicle 1 has a vehicle dynamics control (VDC, ESP), then all the wheels of road vehicle 1 are advantageously braked, possibly individually, in order to apply the yaw moment in phase opposition. Details with respect to ABS, TCS, and VDC can be learned, for example, from the article "*FDR—die Fahrdynamikreglung von Bosch*" by A. van Zanten, R. Erhardt and G. Pfaff, ATZ Automobiltechnische Zeitschrift 96 (1994) 11, pages 674 through 689.

In the event a snaking movement is detected, the essentially periodic yaw moment is applied in a particularly advantageous manner exclusively by appropriate braking interventions at the rear wheels. Influencing the front-wheel brakes in a corresponding manner does not result in the desired stabilization of the trailer or semitrailer. If, because of the slip control implemented in the vehicle or because of the drive concept of the vehicle, these braking interventions of the present invention cannot be carried out exclusively at the rear wheels, then all the wheels of the vehicle are braked, which leads to a deceleration of the towing vehicle and thus of the semitrailer or trailer as well, and consequently to an activation of the inertia braking system. Differentiation must be made in particular between anti-lock braking system (ABS), traction control system ((TCS) and vehicle dynamics control (VDC):

Anti-lock Braking System (ABS):

The classic anti-lock braking system does not permit the implementation of driver-independent braking interventions, by which the braking pressure in the wheel-brake cylinder can be raised over and above the admission pressure adjusted by the driver, that is to say, by which a braking pressure can be built up at all. If the vehicle is equipped with such an anti-lock braking system, then it is only possible to brake all wheels to stabilize the vehicle combination. In this manner, as already explained, the inertia braking system is activated.

Alternatively, the use of an anti-lock braking system provided with a pneumatic brake booster can also be implemented. In the event snaking is detected, the pneumatic brake booster is activated. This provides the possibility of feeding a higher pressure into the wheel-brake cylinders than the admission pressure adjusted by the driver would allow, i.e. to build up a braking pressure anyhow. The essentially periodic yaw moment is achieved by driving the actuators allocated to the wheel-brake cylinders of the rear wheels.

An anti-lock braking system is equipped in series with wheel-speed sensors. It usually does not have a lateral-acceleration sensor or a yaw-rate sensor. That is to say, in this case the measured lateral acceleration and yaw rate, respectively, cannot be evaluated. Instead, in advantageous refinement, using a mathematical model, a variable describing the lateral acceleration or a variable describing the yaw rate is derived from the wheel speeds.

Instead of the lateral acceleration or the yaw rate, it is also possible to evaluate the difference of the wheel rotational frequencies or of the wheel speeds of the non-driven wheels.

Traction Control System (TCS):

A traction control system is used to influence the drive torque at the driven wheels of the vehicle. This is accomplished by braking interventions, with which braking pressure is supplied independently of the driver, and/or by engine interventions with which engine torque is reduced.

If the vehicle is equipped with a traction control system, then the drive concept is of importance with respect to the method and device of the present invention. If it is a vehicle with rear-wheel drive or with four-wheel drive, then the essentially periodic yaw moment can be applied at the rear axle which is necessary for stabilizing the vehicle combination. On the other hand, if it is a front-driven vehicle, this possibility for stabilization does not exist. In this case, it is only possible to brake all the wheels of the vehicle, which leads to activation of the inertia braking system. The remarks made concerning the anti-lock braking system are applicable with respect to the sensors.

Vehicle Dynamics Control (VDC, ESP):

In a vehicle equipped with a vehicle dynamics control, all the wheels can be braked individually and independently of the driver; that is to say, the braking pressure can also be increased or built up over and above the driver admission pressure in order to apply the essentially periodic yaw moment. In addition, all the wheels can also be braked simultaneously, thus activating the inertia braking system. When working with a vehicle dynamics control, the possibility also exists of reducing engine output by engine interventions, and thus likewise activating the inertia braking system.

In this case, the measured lateral acceleration and yaw rate, respectively, can be evaluated, since in each case an appropriate sensor is provided.

Frequency analyzer 50 is to be allocated to step 13 and braking-pressure adjuster 51 is to be allocated to step 14. In addition, braking-pressure calculator 42 has an amplitude monitor 52 used to monitor whether amplitude $A_s$ of the snaking movement has been reduced by braking according to step 14. Amplitude monitor 52 outputs a signal P2 which assumes the value 0 when the amplitude of the snaking movement is not reduced, and the value 1 when amplitude $A_s$ of the snaking movement is reduced. Decision block 15 in FIG. 8 is to be allocated to amplitude monitor 52. Thus, step 16 in FIG. 8 is also to be allocated to braking-pressure adjuster 51.

Finally, with a view to implementing the braking interventions for applying the yaw moment, the following should be mentioned: In the above explanations, it was assumed that the trailer is provided merely with an inertia braking system, and not with brakes allocated to the wheels. In the event that the trailer is also provided with brakes allocated to the wheels, further possibilities result with respect to interventions in the brakes. Thus, the brakes of the towing vehicle or those of the trailer can be activated as explained above either alone, or else jointly. The equivalent holds true for a semitrailer, as well.

What is claimed is:

1. A method for stabilizing a road vehicle (1), particularly a passenger car, having a trailer (2) pulled by the road vehicle (1), characterized in that the road vehicle (1) is monitored with respect to snaking movements, and that when a snaking movement is detected, an essentially periodic yaw moment that is essentially in phase opposition to the snaking movement is applied automatically to the road vehicle (1).

2. The method as recited in claim 1, characterized in that the yaw moment is applied by automatic braking of the road vehicle (1), different braking forces being applied to both sides of the road vehicle (1).

3. The method as recited in claim 2, characterized in that the essentially periodic yaw moment is applied by automatic one-sided braking of the vehicle.

4. The method as recited in claim 1, characterized in that the essentially periodic yaw moment is only applied when a lateral acceleration and/or a yaw rate is present which is not attributable to steering movements by the driver.

5. The method as recited in claim 1, the trailer (2) having an inertia braking system, characterized in that the road vehicle (1) is additionally automatically decelerated for a short duration in such a way that the inertia braking system of the trailer (2) is triggered.

6. The method as recited in claim 1, the trailer (2) having an inertia braking system, characterized in that, after applying the yaw moment, the road vehicle (1) is automatically decelerated for a short duration in such a way that the inertia braking system of the trailer (2) is triggered.

7. The method as recited in claim 1, characterized in that the speed of the road vehicle (1) is reduced such that it is less than a critical speed.

8. The method as recited in claim 1, characterized in that the road vehicle (1) is automatically accelerated for a short duration.

9. A method for stabilizing a road vehicle (1), particularly a passenger car, having a trailer (2) pulled by the road vehicle (1), the trailer (2) having an inertia braking system, characterized in that the road vehicle (1) is monitored with respect to snaking movements, and that when a snaking movement is detected, an essentially periodic yaw moment that is essentially in phase opposition to the snaking movement is applied automatically to the road vehicle (1);

characterized in that the road vehicle (1) is additionally automatically decelerated for a short duration in such a way that the inertia braking system of the trailer (2) is triggered; and characterized in that the automatic, short-duration deceleration for triggering the inertia braking system of the trailer (2) is implemented by reducing the drive torque of an engine propelling the road vehicle (1).

10. The method as recited in claim 9, characterized in that the short-duration automatic deceleration of the road vehicle (1) is carried out shortly—shifted by the amount of a fixed phase—prior to or after a zero crossing of the snaking movement.

11. The method as recited in claim 9,
characterized in that the short-duration automatic deceleration of the road vehicle (1) is only carried out when the application of the yaw moment has resulted in a reduction of the snaking movement.

12. A stabilization device for stabilizing a road vehicle (1), particularly a passenger car, having a trailer (2), characterized in that the stabilization device has means (20) for detecting a snaking movement of the road vehicle (1), as well as for applying an essentially periodic yaw moment to the road vehicle (1) upon detection of a snaking movement, the applied yaw moment being essentially in phase opposition to the snaking movement.

13. A method for stabilizing a road vehicle having a trailer pulled by the road vehicle, comprising the steps of:

monitoring the road vehicle with respect to snaking movements; and when a snaking movement is detected, automatically applying to the road vehicle an essentially periodic yaw moment that is essentially in phase opposition to the snaking movement.

14. The method as recited in claim 13, wherein the road vehicle includes a passenger car.

15. The method as recited in claim 13, wherein the yaw moment applying step includes the substep of applying the yaw moment by automatically braking the road vehicle with different braking forces applied to both sides of the road vehicle.

16. The method as recited in claim 15, wherein the applying step includes the substep of applying the essentially periodic yaw moment is by automatic one-sided braking of the road vehicle.

17. The method as recited in claim 13, wherein the essentially periodic yaw moment is only applied in the applying step when a lateral acceleration and/or a yaw rate is present that is not attributable to steering movements by the driver.

18. The method as recited in claim 13, wherein the trailer includes an inertia braking system, the method further comprising the step of automatically decelerating the road vehicle for a short duration so that the inertia braking system of the trailer is triggered.

19. The method as recited in claim 13, wherein the trailer includes an inertia braking system, the method further comprising the step of automatically decelerating the road vehicle for a short duration after the applying step so that the inertia braking system of the trailer is triggered.

20. The method as recited in claim 18, wherein the decelerating step includes the substep of reducing a drive torque of an engine propelling the road vehicle.

21. The method as recited in claim 20, wherein the decelerating step is performed one of prior to and after a zero crossing of the snaking movement and shifted by an amount of a fixed phase.

22. The method as recited in claim 20, wherein the decelerating step is performed only when an application of the yaw moment results in a reduction of the snaking movement.

23. The method as recited in claim 13, further comprising the step of reducing a speed of the road vehicle to less than a critical speed.

24. The method as recited claim 13, further comprising the step of automatically accelerating the road vehicle for a short duration.

25. A stabilization device for stabilizing a road vehicle having a trailer, comprising:

a first arrangement configured to detect a snaking movement of the road vehicle; and a second arrangement configured to apply an essentially periodic yaw moment to the road vehicle essentially in phase opposition to the snaking movement upon detection of the snaking movement.

26. The device according to claim 25, wherein the road vehicle includes a passenger car.

* * * * *

UNITED STATES PATENT AND TRADEMARK OFFICE
CERTIFICATE OF CORRECTION

PATENT NO. : 6,523,911 B1
DATED : February 25, 2003
INVENTOR(S) : Peter Rupp et al.

It is certified that error appears in the above-identified patent and that said Letters Patent is hereby corrected as shown below:

Column 1,
Line 14, change "973184" to -- 973284 --

Column 4,
Lines 22, 49 and 55, change "$V_F$" to -- $v_F$ --
Line 23, change "$V_{HR}$" to -- $v_{HR}$ --
Line 24, change "$V_{HL}$" to -- $v_{HL}$ --
Lines 34 and 38, change "$P_{HR}$" to -- $p_{HR}$ --
Lines 34 and 38, change "$P_{HL}$" to -- $p_{HL}$ --
Lines 58 and 61, change "$P_{VL}, P_{VR}, P_{HR}, P_{HL}$" to -- $p_{VL}, p_{VR}, p_{HR}, p_{HLF}$ --

Column 5,
Line 58, change "EDR" to -- FDR --

Column 7,
Line 1, change "$\alpha_{yf}<52$" to -- $\alpha_{yf}>52$ --
Line 2, change "$\omega_{ef}<53$" to -- $\omega_{ef}>53$ --
Line 3, change "$V_f<54$" to -- $v_f>54$ --
Line 32, change "yaw rate $\varnothing$." to -- yaw rate $\omega$. --
Line 33, change "phase $\omega_s$" to -- phase $\varnothing_s$ --

Signed and Sealed this

Fifth Day of October, 2004

JON W. DUDAS
*Director of the United States Patent and Trademark Office*